(12) United States Patent
Hong et al.

(10) Patent No.: US 7,260,594 B2
(45) Date of Patent: Aug. 21, 2007

(54) ARITHMETIC LOGIC UNIT OVER FINITE FIELD GF($2^M$)

(76) Inventors: Chun Pyo Hong, 106-506, Boseong-Eunha APT., Sangin-Dong Dalseo-Gu, Daegu (KR); ChangHoon Kim, 851, Pyeonglim-Dong, Tongyoung, Kyungnam (KR)

( * ) Notice: Subject to any disclaimer, the term of this patent is extended or adjusted under 35 U.S.C. 154(b) by 772 days.

(21) Appl. No.: 10/771,592

(22) Filed: Feb. 3, 2004

(65) Prior Publication Data
US 2004/0158598 A1   Aug. 12, 2004

(30) Foreign Application Priority Data
Feb. 5, 2003   (KR) ....................... 10-2003-0007226

(51) Int. Cl.
*G06F 7/72* (2006.01)
(52) U.S. Cl. .................................... 708/492
(58) Field of Classification Search ................. 708/492
See application file for complete search history.

(56) References Cited
U.S. PATENT DOCUMENTS

| | | | |
|---|---|---|---|
| 6,038,581 A | | 3/2000 | Aoki et al. |
| 6,202,076 B1 | | 3/2001 | Aoki et al. |
| 6,763,366 B2 | * | 7/2004 | Hars et al. .................. 708/491 |
| 6,795,553 B1 | * | 9/2004 | Kobayashi et al. ........... 380/28 |
| 6,836,784 B2 | * | 12/2004 | Perkins ....................... 708/491 |
| 7,068,785 B2 | * | 6/2006 | Perkins ......................... 380/30 |

* cited by examiner

*Primary Examiner*—D. H. Malzahn
(74) *Attorney, Agent, or Firm*—Hovey Williams LLP

(57) ABSTRACT

Disclosed herein is an arithmetic logic unit over a finite field GF($2^m$). Arithmetic logic units consistent with the present invention are disclosed as implemented using a division algorithm based on a binary greatest common divisor algorithm and a Most Significant Bit-first multiplication algorithm. The arithmetic logic unit can perform both a multiplication and a division using shared logic. Since the arithmetic logic unit has no limitations in the selection of an irreducible polynomial, and it is very regular and easily formed as a module, the arithmetic logic unit of the present invention has high expansibility and flexibility with respect to the size m of a field. Further, since the arithmetic logic unit of the present invention can perform a multiplication and a division using shared logic, it is very suitable to implement an encryption system for application products requiring a small size, such as smart cards or wireless communication devices.

11 Claims, 4 Drawing Sheets

[Fig. 1]

| MSB-first Multiplication Algorithm Over $GF(2^m)$ |
|---|
| Input : $A(x)$, $B(x)$, $G(x)$ |
| Output : $P(x)=A(x)B(x)\ mod\ G(x)$ |
| 1. $p_k^{(0)}=0$, for $0 \leq k \leq m-1$ |
| 2. $p_{-1}^{(i)}=0$, for $1 \leq i \leq m$ |
| 3. for $i = 1$ to $m$ do |
| 4.    for $k = m-1$ to $0$ do |
| 5.       $p_k^{(i)}=p_{m-1}^{(i-1)}g_k+b_{m-i}a_k+p_{k-1}^{(i-1)}$ |
| 6.    end |
| 7. end |
| 8. $P(x) = p^m(x)$ |

[Fig. 2]

| Division Algorithm Over $GF(2^m)$ |
|---|
| Input: $G(x)$, $A(x)$, $B(x)$ |
| Output: $V$ has $P(x)=A(x)/B(x)\ mod\ G(x)$ |
| Initialize: $R=B(x)$, $S=G=G(x)$, $U=A(x)$, $V=0$, |
|        count=0, state=0 |
| 1. for $i = 1$ to $2m$ do |
| 2.    if state == 0 then |
| 3.       count = count+1; |
| 4.       if $r_0$ == 1 then |
| 5.          $(S, R)=(R, R+S)$; $(V, U)=(U, U+V)$; |
| 6.          state = 1; |
| 7.       end if |
| 8.    else |
| 9.       count = count-1; |
| 10.      if $r_0$ == 1 then |
| 11.         $(S, R)=(S, R+S)$; $(V, U)=(V, U+V)$; |
| 12.      end if |
| 13.      if count == 0 then |
| 14.         state = 0; |
| 15.      end if |
| 16.    end if |
| 17.    $R = R/x$; |
| 18.    if $u_0$ == 0 then |
| 19.       $U = U/x$; |
| 20.    else |
| 21.       $U = (U+G)/x$; |
| 22.    end if |
| 23. end for |

[Fig. 3]
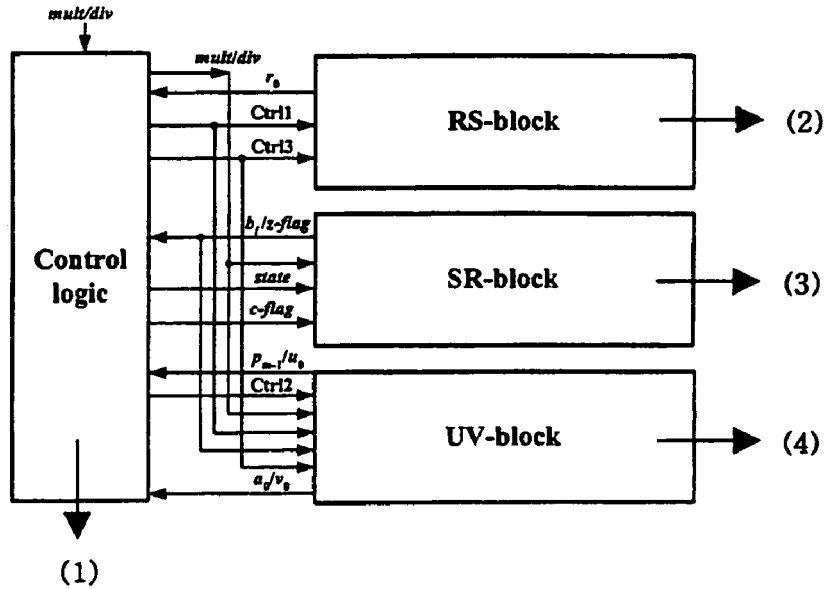
[Fig. 4]
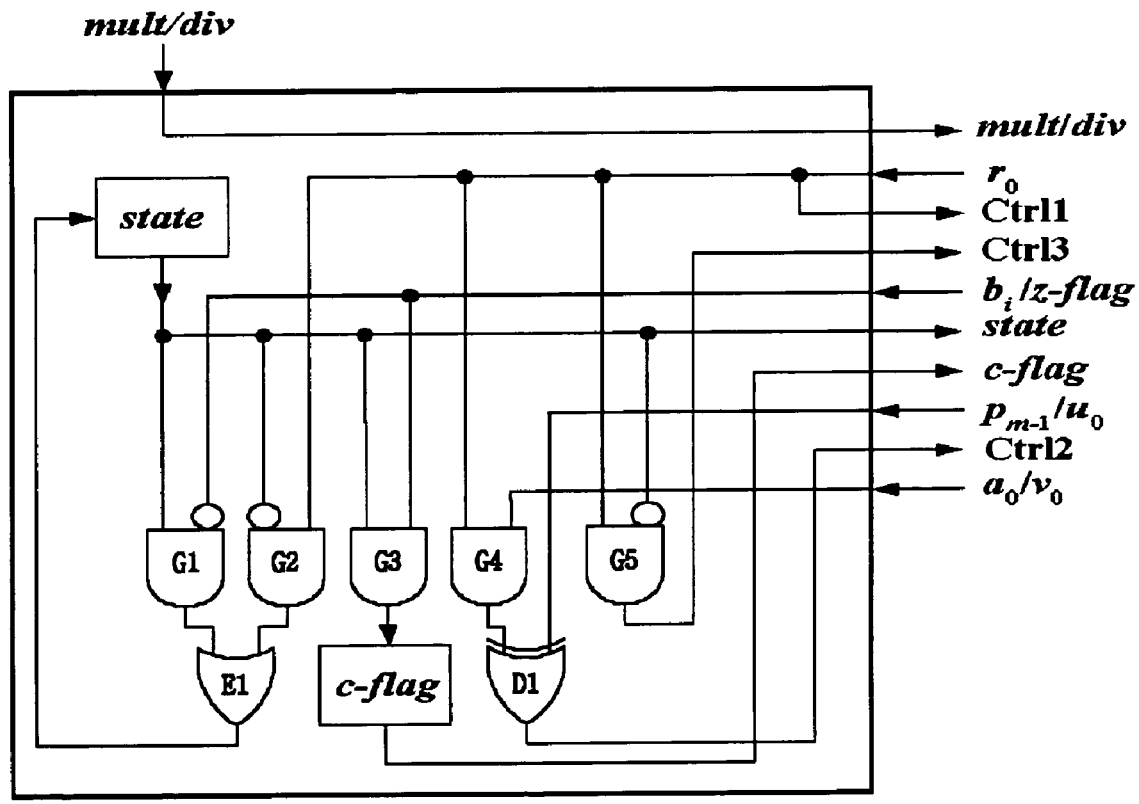

[Fig. 5]
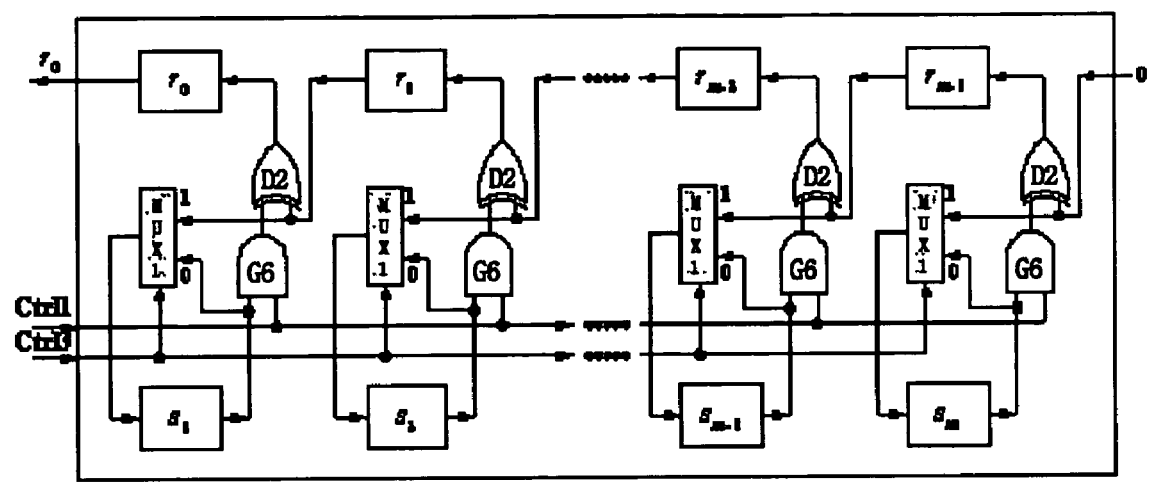
[Fig. 6]
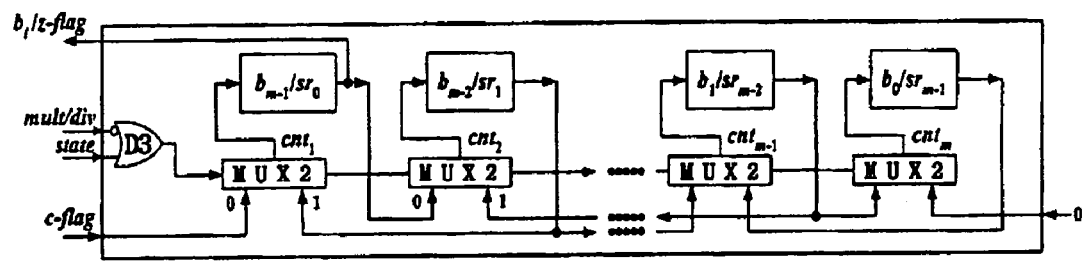

[Fig. 7]
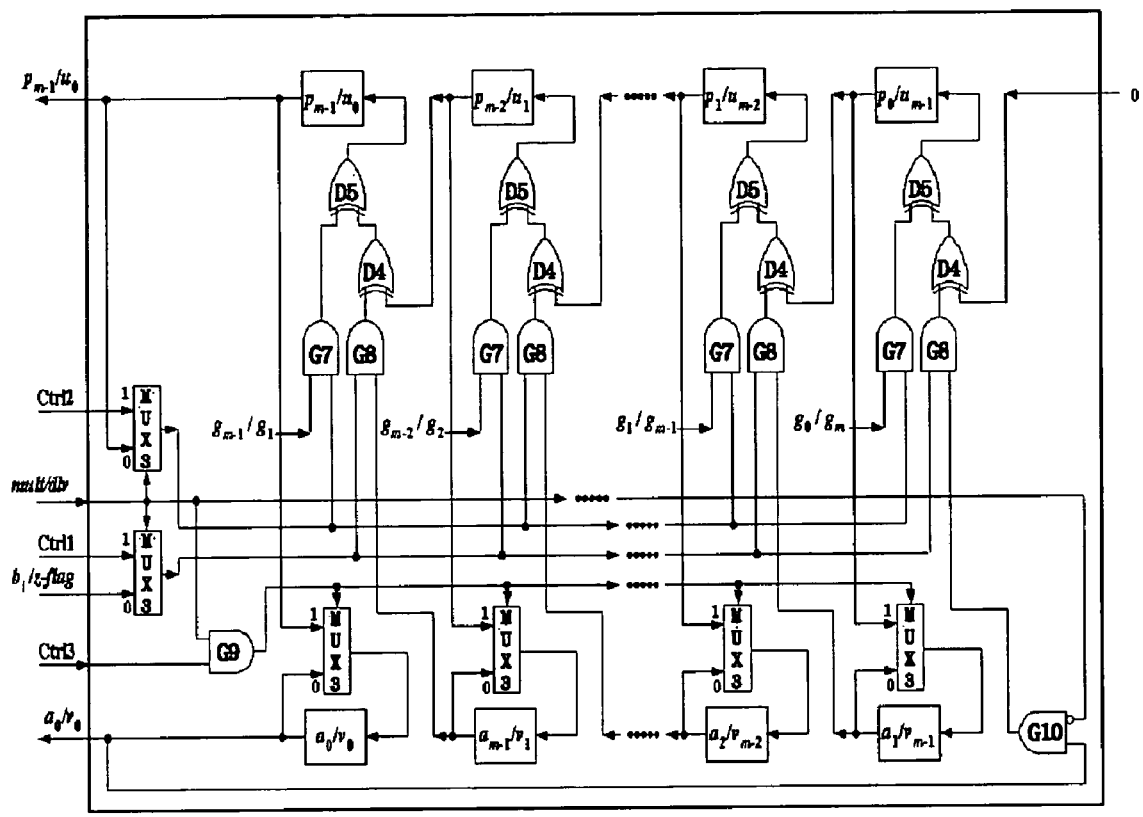

ARITHMETIC LOGIC UNIT OVER FINITE FIELD GF($2^M$)

CROSS-REFERENCES TO RELATED APPLICATIONS

This application is related to Korean Patent Application No. 10-2003-0007226 filed Feb. 5, 2003, and takes priority from that date.

BACKGROUND OF THE INVENTION

1. Field of the Invention

The present invention relates, in general, to arithmetic logic units over a finite field GF ($2^m$) and, more particularly, to an arithmetic logic unit, in which a division algorithm based on a binary greatest common divisor algorithm and a most significant bit-first multiplication algorithm share common logic such as common hardware logic, and both a multiplication and a division can be performed using the shared hardware device.

2. Description of the Related Art

As disclosed in Korean Pat. Appl. No. 1995-22327 (hereinafter referred to as "prior art"), in a conventional multiplication and division unit, a support circuit for multiplication and division operations includes first and second registers for storing input data, a first multiplexer for multiplexing outputs from the second register, an arithmetic logic unit for receiving outputs from the first register and the first multiplexer and arithmetically operating the received outputs in response to an input arithmetic control signal, a shift register capable of reading and writing signals in parallel so as to receive an output from the arithmetic logic unit, perform left and right shifting operations for a multiplication and a division and provide the arithmetic control signal, a gate connected to the arithmetic logic unit so as to gate a negative flag and an overflow flag and output the gated results, and a second multiplexer for receiving and multiplexing the output from the arithmetic logic unit, the output from the gate and the output from the first multiplexer.

However, the prior art is problematic in that the multiplication and division unit of the prior art is divided into structures for performing a multiplication and a division, respectively, and it is not possible to share a single hardware device and perform both a multiplication and a division using the shared hardware device, which are technical characteristics to be accomplished by the present invention.

SUMMARY OF THE INVENTION

Accordingly, the present invention has been made keeping in mind the above problems occurring in the prior art, and an object of the present invention is to provide an arithmetic logic unit, which has functions of performing both a multiplication and a division over a finite field GF($2^m$) using a single hardware device.

By way of general background and as well known to those skilled in the art, arithmetic over the finite field GF(p), or Galois Field, can be useful for efficiently performing numeric calculations in computing devices. Because of its convenience in the context of binary computing devices, a finite field GF($2^m$) can be selected. The finite field GF(2), referred to as the Galois Field of order 2, consists of the set of $\{0, 1\}$. Accordingly, every element of GF($2^m$) can be expressed as a polynomial having exponents between 0 and m−1, and coefficients that are either 0 or 1. With the selection of an irreducible polynomial associated with the finite field GF($2^m$) for a given m, the coefficients associated with each polynomial term can be treated as a vector, and since the coefficients can only be zero or one, the coefficient vector can be treated as a binary integer. In this way, arithmetic operations can be carried out on the binary representations of the polynomials associated with the finite field GF($2^m$).

In order to accomplish the above object, the present invention provides an arithmetic logic unit over a finite field GF($2^m$) proposed to perform a multiplication algorithm of FIG. 1 and a division algorithm of FIG. 2. The arithmetic logic unit comprises a control logic unit, an RS-block unit, an SR-block unit and a UV-block unit, and has a function of performing both a multiplication and a division over the finite field GF($2^m$).

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view showing a Most Significant Bit (MSB)-first multiplication algorithm according to an embodiment of the present invention;

FIG. 2 is a view showing a division algorithm according to an embodiment of the present invention;

FIG. 3 is a block diagram of an arithmetic logic unit for performing both a multiplication and a division according to an embodiment of the present invention;

FIG. 4 is a circuit diagram of a control logic unit of FIG. 3;

FIG. 5 is a circuit diagram of an RS-block unit of FIG. 3;

FIG. 6 is a circuit diagram of an SR-block unit of FIG. 3; and

FIG. 7 is a circuit diagram of a UV-block unit of FIG. 3.

DESCRIPTION OF THE PREFERRED EMBODIMENTS

Hereinafter, embodiments of the present invention will be described in detail with reference to the attached drawings.

Reference now should be made to the drawings, in which the same reference numerals are used throughout the different drawings to designate the same or similar components.

FIG. 1 is a view showing a multiplication algorithm implemented according to the present invention, and FIG. 2 is a view showing a division algorithm implemented according to the present invention. The present invention implements a multiplier and a divider capable of executing the above algorithms, respectively, analyzes the structures of the multiplier and the divider, and recognizes, on the basis of the analyzed results, that a hardware device is shareable. The present invention combines the analyzed results to design an arithmetic logic unit having a function of performing both a multiplication and division over a finite field GF ($2^m$) using a single hardware device.

FIG. 3 is a block diagram of an arithmetic logic unit for performing both a multiplication and a division according to an embodiment of the present invention. The arithmetic logic unit includes a control logic unit 1, an RS-block unit 2, an SR-block unit 3 and a UV-block unit 4, which will be described in detail with reference to FIGS. 4 to 7.

The control logic unit 1 of FIG. 4 generates control signals required for the SR-block unit 3 and the UV-block unit 4 while outputting an externally-applied signal mult/div without change to be used as an input to select a multiplication or division operation.

That is, the control logic unit 1 generates the signal mult/div in response to an external control signal, and then outputs the signal mult/div to both the SR-block unit 3 and the UV-block unit 4, thus setting an operation of the arithmetic logic unit to a multiplication or a division.

Further, the control logic unit 1 generates control signals Ctrl1, Ctrl2, Ctrl3, state and c-flag used to control the RS-block unit 2, the SR-block unit 3 and the UV-block unit 4 so as to perform the above multiplication or division operation of the arithmetic logic unit.

In this case, the control logic unit 1 includes one-bit registers, state and c-flag, an OR gate El and an XOR gate D1, as well as AND gates G1, G2, G3, G4 and G5.

The register c-flag is initialized to "1" when starting a division while operating together with the SR-block unit 3.

The AND gate G1 receives an output value state from the resister state, and also receives an output value $b_i$/z-flag from the SR-block unit 3 through an inverter.

The AND gate G2 receives an output value $r_0$ from the RS-block unit 2, and also receives the output value state from the register state through an inverter.

The AND gate G3 receives the output value state from the register state, and updates a value output from the register c-flag, when receiving the output value $b_i$/z-flag from the SR-block unit 3.

The AND gate G4 receives an output value $r_0$ from the RS-block unit 2 and also receives an output value $a_0/v_0$ from the UV-block unit 4.

The AND gate G5 receives the output value $r_0$ from the RS-block unit 2, and outputs the control signal Ctrl3 to the RS-block unit 3 when receiving the output value state from the register state through an inverter.

The OR gate E1 outputs a signal used to update the value, output from the register state, using the values output from the AND gates G1 and G2.

The XOR gate D1 outputs the control signal Ctrl2 to the UV-block unit 4 using the value output from the AND gate G4, and a value $P_{m-1}/u_0$ output from the UV-block unit 4.

The register c-flag outputs the control signal c-flag to the SR-block unit 3 using the value output from the AND gate G3.

The RS-block unit 2 of FIG. 5 performs an operation on R and S in the division algorithm of FIG. 2, and transmits the output value $r_0$ to the control logic unit 1.

That is, the RS-block unit 2 is constructed by arranging a plurality of circuits in cascade, in each of which one-bit registers r and s, an AND gate G6, an XOR gate D2 and a multiplexer MUX1 are connected to each other, so that, when the control signals Ctrl1 and Ctrl3 are received from the control logic unit 1, the output value $r_0$ is generated and output to the AND gates G2, G4 and G5 of the control logic unit 1.

That is, an output value $r_1$ from a register $r_1$ is input to both the XOR gate D2 and the multiplexer MUX1, which is constructed to receive a value $s_1$ output from the register $s_1$, and the control signal Ctrl3 output from the control logic unit 1.

In this case, an output value from the multiplexer MUX1 is input again to the register $S_1$ and then an output value from the register $s_1$ is input to one input terminal of the AND gate G6. The control signal Ctrl1, output from the control logic unit 1, is input to the other input terminal of the AND gate G6.

The register $r_0$ is constructed to generate the output value $r_0$, which is provided to the AND gates G2, G4 and G5 of the control logic unit 1, when the XOR gate D2 generates a new output value using the value output from the AND gate G6.

In FIG. 5, $r_1$, ¼, $r_{m-2}$ and $r_{m-1}$ and $s_2$, ¼, $s_{m-1}$ and $s_m$ represent one-bit registers, and MUX1 represents 2-input multiplexers.

Meanwhile, FIG. 6 is a detailed circuit diagram of the SR-block unit 3. The SR-block unit 3 is constructed so that a plurality of one-bit registers $b_{m-1}/sr_0$, $b_{m-2}/sr_1$, ¼, $b_1/sr_{m-2}$ and $b_0/sr_{m-1}$ and two-input multiplexers MUX2, which are arranged in cascade, are each connected to one OR gate D3.

The OR gate D3 receives the signal mult/div from the control logic unit 1 through an inverter, and also receives the output value state from the register state of the control logic unit 1.

The multiplexers MUX2 output signals $cnt_1$, $cnt_2$, ¼, $cnt_{m-1}$ and $cnt_m$ used to update the values $b_{m-1}/sr_0$, $b_{m-2}/sr_1$, ¼, $b_1/sr_{m-2}$ and $b_0/sr_{m-1}$, respectively, using the output value from the OR gate D3, the output value c-flag from the register c-flag of the control logic unit 1, and the output values $b_{m-1}/sr_0$, $b_{m-2}/sr_1$, ¼, $b_1/sr_{m-2}$ and $b_0/sr_{m-1}$, which are fed back from the registers $b_{m-1}/sr_0$, $b_{m-2}/sr_1$, ¼, $b_1/sr_{m-2}$ and $b_0/sr_{m-1}$, respectively After the registers $b_{m-1}/sr_0$, $b_{m-2}/sr_1$, ¼, $b_1/sr_{m-2}$ and $b_0/sr_{m-1}$ are constructed to update their output values using the signals $cnt_1$, $cnt_2$, ¼, $cnt_{m-1}$ and $cnt_m$, which are output from the multiplexers MUX2, they feed back the updated values to the multiplexers MUX2, and to output the value $b_i$/z-flag to the AND gates G1 and G3 of the control logic unit 1.

In this case, the SR-block unit 3 uses m-bit bidirectional shift registers, instead of a $\log_2(m+1)$-bit counter, so as to implement a counter associated with the count value of the division algorithm of FIG. 2.

That is, if "0" (zero) is applied to the signal mult/div when the multiplication operation of FIG. 1 is performed, the values from the bidirectional registers shift in only a left direction because the state value is always "1" (one).

Further, if "1" is applied to the signal mult/div when the division operation is performed, the values from the bidirectional registers shift in left and right directions according to the state value.

FIG. 7 shows the UV-block unit 4 for performing an operation on U and V in the division algorithm of FIG. 2.

Referring to FIG. 7, the UV-block unit 4 is constructed so that a plurality of registers $P_{m-1}/u_0$, $P_{m-2}/u_1$, ¼, $P_1/u_{m-2}$ and $P_0/u_{m-1}$ are connected in cascade so as to output a value $P_{m-1}/u_0$ to the XOR gate D1 of the control logic unit 1.

Further, in the UV-block unit 4, a plurality of registers $a_0/v_0$, $a_{m-1}/v_1$, ¼, $a_2/v_{m-2}$ and $a_1/v_{m-1}$ are connected in cascade so as to output a value $a_0/v_0$ to the AND gate G4 of the control logic unit 1.

Further, in the UV-block unit 4, multiplexers MUX3, AND gates G7 and G8, and XOR gates D4 and D5 are connected in cascade so as to update values output from the registers $P_{m-1}/u_0$, $P_{m-2}/u_1$, ¼, $P_1/u_{m-2}$ and $P_0/u_{m-1}$ and $a_0/v_0$, $a_{m-1}/v_1$, ¼, $a_2/v_{m-2}$ and $a_1/v_{m-1}$.

Moreover, the UV-block unit 4 includes an AND gate G9 that consistently generates "0" in the multiplication mode to allow the multiplexers MUX3 to select the values output from the registers $a_0/v_0$, $a_{m-1}/v_1$, ¼, $a_2/v_{m-2}$ and $a_1/v_{m-1}$ in response to the signals mult/div and Ctrl3, which are output from the control logic unit 1, and an AND gate G10 that consistently generates "0" in the division mode.

That is, in FIG. 7, the control signal Ctrl2, the signal $P_{m-1}/u_0$, and the signal mult/div are input to one multiplexer MUX3. The control signal Ctrl1, the signal $b_i$/z-flag and the signal multi/div are input to another multiplexer MUX3. A value output from the former multiplexer MUX3 and a value $g_{m-1}/g_1$ are input to the AND gate G7. The value $a_{m-1}/v_1$ and a value output from the latter multiplexer MUX3 are input to the AND gate G8. A value output from the AND gate G8 and the value $P_{m-2}/u_1$ are input to the XOR gate D4. A value output from the AND gate G7 and a value output from the XOR gate D4 are input to the XOR gate D5 to allow a value output from the one-bit register $P_{m-1}/u_0$ to be updated, and then the value $P_{m-1}/u_0$ is output to the control logic unit 1.

Meanwhile, the signal mult/div and the control signal Ctrl3 are input to the AND gate G9. When an output value from the AND gate G9 and the output values $P_{m-1}/u_0$ and $a_0/v_0$ from the one-bit registers are input to the other multiplexer MUX3 to generate an output value, the output value is input to the one-bit register $a_0/v_0$. Therefore, the one-bit register $a_0/v_0$ outputs a value $a_0/v_0$ thereof to the control logic unit 1. The output value $a_0/v_0$ is re-input to the multiplexer MUX3.

In this case, the control signal mult/div is input to the AND gate G10 through an inverter, and the output value $a_0/v_0$ from the one-bit register $a_0/v_0$ is also input to the AND gate G10. The AND gate G10 consistently generates "0" in the division mode.

In this case, Table 1 compares the arithmetic logic unit of the present invention and a conventional multiplication and division unit.

tion does not require separate multiplication and division modules by utilizing shared logic resources in the arithmetic logic unit.

Therefore, the arithmetic logic unit of the present invention is very suitable to implement an encryption system of applications requiring a small area, such as smart cards or wireless communication devices. Further, since the present invention has high expansibility and flexibility with respect to the size m of a field, it can be variously applied to arithmetic logic units over the finite field GF ($2^m$), and it is very useful for industries using an encryption system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An arithmetic logic unit over a finite field GF ($2^m$), comprising:

a control unit for generating control signals required for an RS-block unit, an SR-block unit and a UV-block unit while outputting an externally-applied signal (mult/div) to be used as an input to select multiplication and division operations without change;

the RS-block unit for generating an output value ($r_0$) when receiving the control signals from the control logic unit,

TABLE 1

Performance of conventional dividers and arithmetic logic unit of present invention

|  | Brunner [1] | Guo [2] | Arithmetic unit of the present invention |
|---|---|---|---|
| Throughput (1/cycles) | 1/2m | 1/m | 1/2m − 1 |
| Delay (cycles) | 2m | 5m − 4 | 2m − 1 |
| Maximum processing delay | Tzero − detector + $2T_{AND2}$ + $2T_{XOR}$ + $2T_{MUX2}$ | $T_{AND2}$ + $3T_{XOR2}$ + $T_{MUX2}$ | $2T_{AND2}$ + $3T_{XOR2}$ + $T_{XOR2}$ |
| Components of circuit | $AND_2$: 3m + $\log_2$(m + 1)<br>$XOR_2$: 3 m + $\log_2$(m + 1)<br>Latch: 4m + $\log_2$(m + 1)<br>$MUX_2$: 8m | $AND_2$: 16m − 16<br>$XOR_2$: 10m − 10<br>Latch: 44m − 43<br>$MUX_2$: 22m − 22 | $AND_2$: 3m + 7<br>$XOR_2$: 3m + 1<br>$OR_2$: 2<br>Latch: 5m + 2<br>$MUX_2$: 3m + 2<br>Inverter: 5 |
| The number of transistors | 110m + 18$\log_2$(m + 1) | 608m − 432 | 88m + 84 |
| Operation | Division | Division | Multiplication/division |

$AND_i$: i-input AND gate,
$XOR_i$: i-input XOR gate,
$OR_i$: i-input OR gate,
$MUX_i$: i-to-1 multiplexer,
$T_{ANDi}$: transmission delay generated through one $AND_i$ gate,
$T_{XORi}$: transmission delay generated through one $XOR_i$ gate,
$T_{MUXi}$: transmission delay generated through one $MUX_i$ gate, and
Tzero-detector: transmission delay generated through $\log_2$(m + 1)-bit zero-detector.

As described above, the present invention provides an arithmetic logic unit over a finite field GF ($2^m$), which reduces a calculation delay and the number of transistors used to implement a required hardware device by comparing and analyzing only a divider function of the arithmetic logic unit of the present invention and those of the conventional dividers, as shown in the above Table 1.

Further, in the prior art, separate multiplication and division modules were used to implement an arithmetic logic unit over a finite field GF($2^m$). However, the present invenand transmitting the output value ($r_0$) to the control logic unit, and calculating R and S values of multiplication and division algorithms;

the SR-block unit for performing multiplication and division operations when receiving a control signal output from the control logic unit and a value state output from a one-bit register (state) of the control logic unit, and shifting register values in right and left directions; and a UV-block unit for outputting one-bit register values ($P_{m-1}/u_0$ and $a_0/v_0$) to the control logic unit when receiving the control signals from the control logic unit, and calculating U and V values of multiplication and division algorithms.

2. The arithmetic logic unit according to claim 1, wherein the control logic unit comprises:
   an AND gate (G1) for receiving the output value (state) from the one-bit register (state), and also receiving an output value ($b_i$/z-flag) from the SR-block unit through an inverter;
   an AND gate (G2) for receiving the output value ($r_0$) from the RS-block unit, and also receiving the output value (state) from the one-bit register (state) through an inverter;
   an AND gate (G3) for receiving the output value (state) from the one-bit register (state), and updating a value output from a register (c-flag) when receiving the output value ($b_i$/z-flag) from the SR-block unit;
   an AND gate (G4) for receiving the output value ($r_0$) from the RS-block unit, and also receiving the output value ($a_0/v_0$) from the UV-block unit;
   an AND gate (G5) for receiving the output value ($r_0$) from the RS-block unit, and outputting a control signal (Ctrl3) to the RS-block unit when receiving the output value (state) from the one-bit register;
   an OR gate for outputting a signal used to update the output value (state) from the one-bit register (state) using values output from the AND gates (G1 and G2);
   an XOR gate for outputting a control signal (Ctrl2) to the UV-block unit using a value output from the AND gate (G4) and the value ($P_{m-1}/u_0$) output from the UV-block unit; and
   the register (c-flag) for outputting the value (c-flag) to the SR-block unit using a value output from the AND gate (G3).

3. The arithmetic logic unit according to claim 2, wherein the register (c-flag) is initialized to "1" when starting a division while operating together with the SR-block unit.

4. The arithmetic logic unit according to claim 1, wherein the RS-block unit is constructed so that structures are arranged in cascade, the structures each comprising:
   a multiplexer for receiving values output from registers (r and s), and a control signal (Ctrl3) output from the control logic unit;
   an AND gate for receiving a value output from the register (s) and a control signal (Ctrl1) output from the control logic unit;
   an XOR gate for receiving a value output from the register (r) and a value output from the AND gate;
   the register (r) for generating the register value ($r_0$) using a value output from the XOR gate and outputting the register value ($r_0$) to the control logic unit; and
   the register (s) for generating a register value (s) using a value output from the multiplexer.

5. The arithmetic logic unit according to claim 1, wherein the SR-block unit is constructed so that structures are arranged in cascade, the structures each comprising:
   an OR gate for receiving the signal (mult/div) from the control logic unit through an inverter, and also receiving the output value (state) from the one-bit register (state) of the control logic unit;
   a multiplexer for outputting a signal used to update a register ($b_i$/z-flag) using a value output from the OR gate, the value (c-flag) output from the register (c-flag) of the control logic unit and a value fed back from the register ($b_i$/z-flag); and
   a register ($b_i$/z-flag) updated using the update signal output from the multiplexer, and then feeding back the updated signal to the multiplexer, while providing the value ($b_i$/z-flag) output from the register ($b_i$/z-flag) to the control logic unit.

6. The arithmetic logic unit according to claim 5, wherein the register ($b_i$/z-flag) is implemented by an m-bit bidirectional shift register, instead of a $\log_2(m+1)$-bit counter, so as to operate a count value of a division algorithm.

7. The arithmetic logic unit according to claim 1, wherein the UV-block unit comprises:
   structures which are arranged in cascade, the structures each having a register for outputting the register value ($P_{m-1}/u_0$) to the control logic unit, a register for outputting the register value ($a_0/v_0$) to the AND gate of the control logic unit, and a multiplexer, AND gates and XOR gates for updating the values output from the registers;
   an AND gate for consistently generating "0(zero)" in a multiplication mode so as to allow the multiplexer to select the value ($a_0/v_0$) output from the register ($a_0/v_0$) in response to the signals (mult/div and Ctrl3) output from the control logic unit; and
   an AND gate for consistently generating "0(zero)" in a division mode using the signal (mult/div) output from the control logic unit and the value ($a_0/v_0$) output from the register ($a_0/v_0$).

8. The arithmetic logic unit according to claim 1, wherein the division algorithm is implemented based on a binary greatest common divisor algorithm.

9. A Galois Field arithmetic logic unit for performing arithmetic operations comprising a multiplication operation and a division operation over the Galois field $GF(2^m)$, the arithmetic logic unit comprising:
   a control logic unit configured to receive an operation-type indication regarding whether to perform the multiplication operation or the division operation, the control logic unit comprising at least one control logic latch, and a plurality of control logic gates to receive control inputs and to provide control outputs for performing the arithmetic operations using input and output registers sharing common logic for both multiplication and division operations;
   a first logic block including a first and second set of first-logic-block latches and associated first-logic-block gates, the first logic block operable to transfer data contents from the second set of first-logic-block latches to the first set of first-logic-block latches, the first logic block further operable to compute a first-logic-block exclusive OR value on the contents of the first and second set of first-logic-block latches;
   a second logic block including a set of second-logic-block latches and associated second-logic-block gates, the second logic block including a multiplexer and at least one second-logic-block gate arranged to configurably permit the second logic block to operate as a bidirectional shift register; and
   a third logic block including a first and second set of third-logic-block latches and associated third-logic-block gates, the third-logic-block gates configured to selectably produce a third-logic-block exclusive OR operation on the contents the first and second set of third-logic-block latches or on an externally provided set of bits.

10. The Galois Field arithmetic logic unit according to claim 9, wherein the control logic unit comprises:
   a one-bit state latch having an associated state-latch value that is determined by a state latch function of the sum of the product of the state-latch value and the inverse of a second-logic-block output control signal and the product of the inverse of the state-latch value and a first-logic-block output control signal; and a one-bit c-flag latch having an associated c-flag value that is determined by the product of the second-logic-block output control signal and the state latch value.

11. A method for performing multiplication and division operations over the finite field $GF(2^m)$, the method comprising:

receiving an operation-type indication regarding whether to perform the multiplication operation or the division operation, at a control logic unit comprising at least one control logic latch;

providing control signals, based on the operation-type indication, to at least one logic block that contains shared logic gates for performing the multiplication and division operations, the shared logic gates forming a logic structure including a configurable shared bidirectional shift register and at least one exclusive OR operator;

maintaining a state value based on a combination of the present state and a control signal from the logic block; and computing an output value consistent with the multiplication and division operations based on the state value, input values, and the operation-type indication.

* * * * *